UNIPOLAR TRANSISTOR WITH NARROW CHANNEL
BETWEEN SOURCE AND DRAIN
Filed Nov. 29, 1957
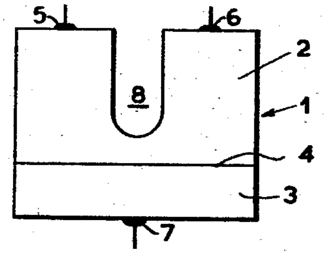
PRIOR ART
FIG. 1
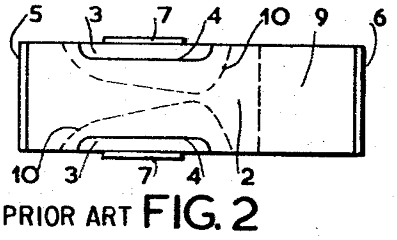
PRIOR ART FIG. 2
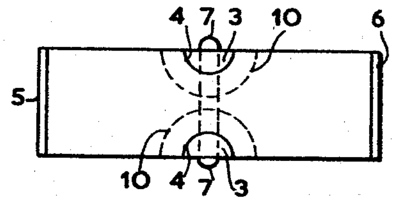
PRIOR ART FIG. 3
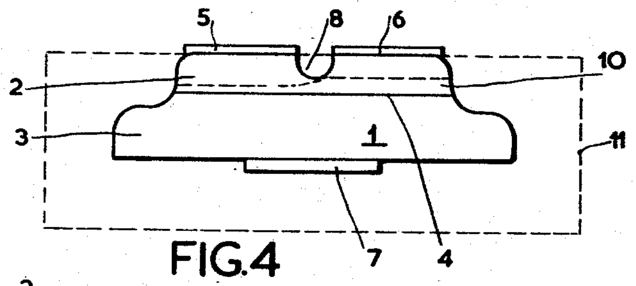
FIG. 4
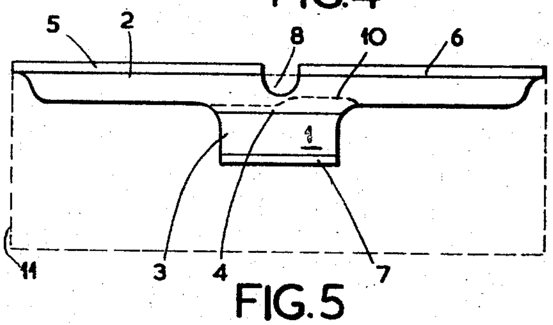
FIG. 5
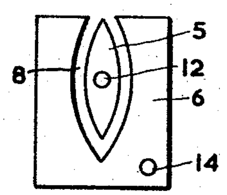
FIG. 6
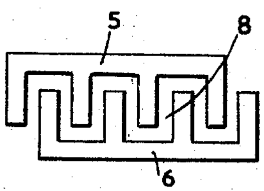
FIG. 7
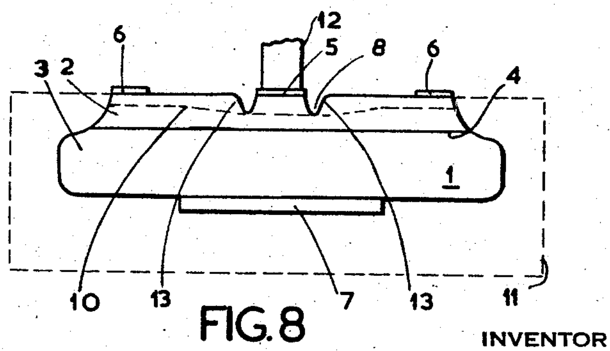
FIG. 8
INVENTOR
JULIAN ROBERT ANTHONY BEALE
BY
Frank R. Jifari
AGENT 3,344,324
Patented Sept. 26, 1967

3,344,324

UNIPOLAR TRANSISTOR WITH NARROW CHANNEL BETWEEN SOURCE AND DRAIN

Julian Robert Anthony Beale, Wraysbury, near Staines, England, assignor to North American Philips Company, Inc., New York, N.Y.

Filed Nov. 29, 1957, Ser. No. 699,742
Claims priority, application Great Britain, Dec. 13, 1956, 38,094/56
16 Claims. (Cl. 317—235)

This invention relates to field-effect transistors, and in particular to such transistors comprising a semi-conductive body having a region of one conductivity type which is adjacent the surface and which passes into a zone of opposite conductivity type at a distance below this surface. An ohmic source and an ohmic drain are provided side by side on the said one region, and are separated by a groove which narrows the current path from the source to the drain in said one region above the transition to the said other region, the said other region together with the electrode provided on it constituting the gate of the system. The invention also relates to methods of manufacturing such semi-conductive devices.

As is well-known, the operation of a field-effect transistor is based upon the fact that when a blocking voltage is applied to the gate, a depletion layer (that is a layer which substantially does not contain mobile charge carriers) is produced at the transition between the gate and the current path, which depletion layer penetrates more or less the current path from the source to the drain as a function of the value of the blocking voltage applied and thus may considerably act upon the electric conductivity along this current path. An expansion of the depletion layer on the side of the current path of the p-n transition is obtained by making the specific resistance of the current-path region of the semi-conductive body high with respect to the specific resistance on the other side of the p-n transition in the gate region of the semi-conductive body. It is known that a power gain may thus be obtained by means of a field-effect transistor.

Before proceeding to discussing the invention, the prior art relating to field-effect transistors will now be explained more fully with reference to FIGS. 1 to 3 of the accompanying drawing showing in longitudinal section three different embodiments of known type.

In Australian patent specification 9642/52, which was published on July 3, 1952, the principle of a field-effect transistor is already described and explained inter alia with reference to the embodiment of FIG. 1. The device shown in FIG. 1 comprises a drawn mono-crystalline body 1 in which a semi-conductive region 2 of the n-type and a semi-conductive region 3 of the p-type, relatively separated by a p-n transition 4, are provided by varying the impurity content of the melt during the drawing of the crystal. An ohmic source 5 and an ohmic drain 6 are provided on the n-type region 2, the p-type region 3 together with the electrode 7 provided thereon constituting the gate of the system. Milled in the semi-conductive body between the source 5 and the drain 6 is a groove 8 which narrows the current path between said two electrodes in the n-type region 2 above the p-n transition 4. Although this structure of a field-effect transistor in which the source and the drain are provided side by side and separated by a groove penetrating from the surface into the semi-conductive body in the direction of the gate, is usable per se, the further elaboration of this structure and the manufacturing method, such as described in the above-mentioned patent specification, lacks the very steps which make it possible in such a structure to fulfil the high requirements imposed in practice upon a field-effect transistor with regard to its reproducibility, stability, noise, frequency characteristic and also manufacturing cost.

Other embodiments have, therefore, been designated, which are shown in longitudinal section in FIGS. 2 and 3. The field-effect transistor of FIG. 2 has a rectangular cross-section at right angles to the plane of drawing. On two opposite sides of the body there are provided the source 5 and the drain 6 which, together with the n-type region 2 of the cody, constitute ohmic junctions. On the two other opposite sides there are provided the gate electrodes which comprise the p-type regions 3 and the electrodes 7 provided thereon. In order to avoid negative resistance effects at the gate electrodes due to an injection of holes from the drain 6 into the gate electrodes, a portion 9 of the n-type region 2 which is located between the drain 6 and the dotted line 10 is doped with a particularly high content of donors and thus has a high conductivity of electrons and a low content of holes. A penetration of the depletion layer into the n-type region 2 which occurs at a given blocking voltage at the gate electrodes is indicated by the dotted lines 10. The two parts constituting the depletion region are each wedge-shaped since the blocking voltage at the transition of the gate increases in the direction of the drain as a result of the voltage drop along the current path from the source 5 to the drain 6. FIG. 3 shows another known embodiment of a field-effect transistor, the semi-conductive body of which has a circular cross-section at right angles to the plane of the drawing. The source 5 and the drain 6 in this case also are provided on two opposite sides, that is to say on the two end surfaces of the cylindrical body. However, the p-type region 3 and the electrode 7 provided thereon, which together constitute the gate, surround the n-type region 2 in an annular manner. The expansion of the depletion layer indicated by 10 for a certain blocking voltage at the gate thus is in this case likewise a figure of revolution. An important disadvantage of the two last-mentioned embodiments is that, according to these embodiments, it is very difficult in practice to manufacture field-effect transistors having a cut-off frequency higher than 10 mc./s., since the cut-off frequency is inversely proportional to the product of the capacity of the gate and the resistance between the source and the drain, at least in so far as it is present between the gate electrodes. Both this capacity and this resistance are proportional to the length of the current path from the source to the drain, in so far as it is located between the gate electrodes, and hence the cut-off frequency is inversely proportional to the square of this length. In these embodiments, in which the gates are located between the source and the drain, an arbitrary reduction of this length, which is approximately equal to the length of the gates in the direction of the current path, is naturally impossible for practical reasons and hence a practical upper limit is set to the cut-off frequency.

The object of the invention is inter alia to provide steps which may readily be carried out and which permit of obtaining a field-effect transistor which does not or substantially does not show the disadvantages of the above-mentioned known devices and which may have particularly good properties in many respect, inter alia with regard to reproducibility, noise, cut-off frequency and stability. The invention is based up on an embodiment which is fundamentally similar to the known embodiment of FIG. 1, but it provides steps which can readily be carried out and which permit the very realisation of such an embodiment making it usable and particularly suitable in practice.

In a field-effect transistor according to the invention comprising a semi-conductive body having a region of the one conductivity type which is adjacent the surface and which passes into a region of opposite conductivity type at a distance below this surface, an ohmic source and an ohmic drain being provided side by side on the said one region, separated by a groove narrowing the current path from the source to the drain in the said one region above the transition to the said other region, while the said other region together with the electrode provided therein constitutes the gate of the system, the said one region, at least for a portion located at the surface and on which the source and the drain are provided, consists of a layer diffused into this surface and having a conductivity type similar to that of the said one region, the groove between the electrodes breaking at least locally through the surface of the diffused layer above the gate. The said one region preferably consists wholly of a layer diffused into the surface. The term "layer diffused into the surface" is to be understood in this case to mean a layer which by diffusion of one or a plurality of impurities of a certain kind from a medium adjacet this surface, more particularly a gas or a liquid or a solid material, is provided in the body via this surface. However, it must be distinguished from a layer provided by allowing (a method which previously in certain cases was wrongly indicated as diffusion) whereby the layer of the semi-conductive body is first dissolved in a melt provided thereon and deposits again at its initial position during the subsequent cooling while segregating impurities available in the melt. A characteristic of a diffused layer is inter alia that such a layer in a plane in and immediately below the surface along which the impurity has diffused into the body, has a comparatively high content of such impurities, that is to say, has a low-ohmic surface, the content of impurities being graded and considerably decreasing deeper in the layer and hence also the local conductivity. With a layer provided by alloying, however, the content in the layer is usually very high up to its full depth of penetration. The present invention inter alia makes a special use of the low-ohmic surface in a diffused layer, as will be explained more fully hereinafter. When the semi-conductive body consists of germanium, the specific resistance of the semi-conductive body in the low-ohmic surface of the diffused layer is preferably chosen lower than 0.5 ohm-cm. If the semi-conductive body consists of silicon, the specific resistance of the semi-conductive body in the low-ohmic surface of the diffused layer is chosen preferably lower thn 1 ohm-cm.

In addition to the advantage with respect to the known devices of FIGS. 2 and 3, in which the transition of the gate is located between the source and the drain and hence the shortest distance obtainable between the source and the drain is limited by the required width of the gate transition, whereas in the device according to the invention this limitation is much less important, the advantage of low noise may be obtained as a result of the fact that both the source and the drain are provided on the low-ohmic surface region of the diffused layer, the noise being dependent upon the diffusion of minority load carriers, and since the source and the drain are each provided on a surface region having a low specific resistance, the available number of the minority load carriers and hence also the diffusion of minority load carriers is small and the noise low. Between the source and the drain in the said one region there is provided a groove which breaks at least locally through the surface of the diffused layer above the gate. This low-ohmic, i.e., low-resistance or high-conductive, surface is interrupted only at the groove. Due to the presence of this low-ohmic surface, the source and drain are so-to-say displaced to adjacent the groove. The field-effect transistor according to the invention thus affords the further advantage of a low series-resistance and, due to the presence of a low-ohmic region in front of the drain, a high stability. Below the low-ohmic surface of a diffused region, the specific resistance considerably increases and the groove must, therefore, penetrate at least up to this region in order to be located inside the region of the depletion layer of the gate. The shortest distance between the source and the drain, as measured along the surface of the semi-conductive body, is preferably chosen smaller than twice the shortest distance between the source and the transition of the gate and/or the shortest distance between the drain and the transition of the gate. In this connection it is to be noted that the terms "source" and "drain" are to be understood to mean either the contact body proper on the semi-conductive body or, if a low-ohmic zone is located directly in front of the relevant contact body, the virtual source or the virtual drain at the area where the low-ohmic region in the direction of the other electrode ends.

According to a further aspect of the invention, a comparatively long groove is provided between the source and the drain. The length of the groove is preferably greater than 1.5 times the smaller of the two largest dimensions of the source and the drain. Thus, of the source and the drain, the one may be provided approximately at the centre on the said region and completely surrounded by said groove whereas the other electrode is provided outside this groove. In plan view, the one electrode, for example the source, is then preferably circular, whereas the other electrode concentrically surrounds the one electrode in an annular manner. As an alternative, the one electrode may be lens-shaped and be surrounded or at least substantially surrounded by the other electrode. Again another embodiment is that in which the source and the drain are each comb-like, the toothlike parts of said electrodes meshing into each other, but being separated by the said groove. By the provision of a comparatively long groove, which is to be understood to mean a groove longer than a rectilinear groove, it is possible to obtain the further advantage that the trans-conductance usually indicated in literature by $g_m$, increases without increase of the capacity, which is proportional to the contact surface. This aspect of the invention may also be realised in this embodiment in a very simple manner. The said one region, in which the current path extends from the source to the drain, is preferably n-conducting, since the mobility of electrons is usually greater than that of holes.

According to a further aspect of the invention, this field-effect transistor may be manufactured in a simple and reproducible manner. Thus, for example, a diffused surface layer may be provided in an n-conductive body by diffusion of a donor. An acceptor constituting the gate may then be alloyed onto the other side of the body. The ohmic source and the ohmic drain are provided side by side on the opposite diffused surface layer. Between the source and the drain there is provided, for example by etching, a groove which locally breaks between these electrodes at least through the low-ohmic surface of the diffused layer. A shortest distance between the source and the drain which is less than 250 microns, may also be obtained in a simple manner by utilizing the effect that by the provision of the low-ohmic surface of the diffused layer, the source and the drain are displaced toward each other. Said distance is preferably chosen smaller than 125 microns or even smaller than 50 microns.

A particularly suitable method according to the invention consists in that diffused into a semi-conductive body of a given conductivity type is a surface layer of opposite conductivity type and that an ohmic source and an ohmic drain are provided on part of this layer, a groove being provided between these electrodes, for example by etching, which breaks at least locally between these electrodes through the surface of the diffused layer. It is also possible to provide an ohmic electrode on the layer diffused into the surface and then divide the ohmic electrode into the source and the drain by removal of part of this electrode. At the same time or thereafter, the groove may be provided, for example by etching. The groove is preferably provided round an ohmic electrode by electrolytic means, more particularly if one of the ohmic electrodes lies at the centre, round the central electrode. This may be effected by applying in a suitable etching bath a positive voltage to the relevant electrode with respect to the etching bath. During the electrolytic etching process, one may advantageously utilize the effect that, on applying a voltage in the blocking direction between the one electrode and the gate electrode, the etching process goes on and is continued until the groove reaches the depletion layer corresponding to the blocking voltage concerned, whereupon it terminates.

The current path through the semi-conductive body extends in the said one region between the source and the drain, on the one hand, and the p-n transition of the gate electrode, on the other. The p-n transition of the gate electrode with respect to the source and the drain is preferably provided so that the p-n transition, as reckoned in the direction at right angles to the current path from the source to the drain, covers at least in part the source and the drain or both electrodes.

The various aspects of the invention will now be explained in greater detail with reference to some figures and embodiments.

FIGS. 4 and 5 show in section two different embodiments of a field-effect transistor according to the invention.

FIGS. 6 and 9 are plan views of two further embodiments of a field-effect transistor according to the invention.

FIG. 7 is a plan view of a suitable electrode arrangement.

FIG. 8 is a sectional view of a further particular embodiment of a field-effect transistor according to the invention.

In the field-effect transistor according to the invention as shown in FIG. 4, a source 5 and a drain 6 are provided which constitute ohmic contacts with a diffused layer 2 of the n-type. The source 5 and the drain 6 are located side by side and separated by means of a groove 8 which penetrates layer 2 through a distance such that it is located within the region of the depletion layer 10 of the p-n junction 4 of the gate. An example of the expansion of the depletion layer is represented by the dotted line 10. The shortest distance between the source and the drain is approximately 125 microns and this distance is considerably less than the width of the p-n transition 4, as measured in the direction of the current path from the source to the drain, that is to say from the left to the right in the figure.

One example of the manufacture of the transistor shown in FIG. 4 will now be discussed. The starting point is for example, a mono-crystal body of p-type conductivity, the size of which is represented by the dotted line 11. The initial body has a substantially rectangular cross-section at right angles to the plane of the drawing. A donor impurity is diffused into this p-conductive body, so that the body is surrounded throughout by an n-conductive region. The lower side of the body is then removed, for example by chemical etching, the gate 7 being provided on the p-conductive region 3 which has been exposed. The source 5 and the drain 6 are then provided on the side of the semi-conductive body which is opposite the gate and the body is etched so that the n-conductive surface layer is removed throughout except those parts which are located under and between the source and the drain. Subsequently, a groove 8 is etched in the surface of the body between the source 5 and the drain 6 in a manner such that the lower side of the groove does not pass nor closely approach the p-n transition 4. The current path from the source 5 to the drain 6 is bent below the groove 8 in the direction of the gate transition 4, so that it may readily be interrupted completely by a depletion layer without the risk of the depletion layer reaching the source and the drain before this interruption takes place. During etching, the low-ohmic surface of the diffused layer between the contacts 5 and 6 is completely removed.

Several steps of this method will now be described, for example, in greater detail.

The starting point is constituted by a p-conductive semi-conductive body which consists of germanium and a content of indium as an acceptor such that the specific resistance is about 1 ohm-cm.

The diffusion takes place so that a mixture of antimony trichloride vapor and hydrogen gas is guided over the p-type body, the body being heated in an oven at about 770° C. for about 1.5 hours. The speed of flow of the hydrogen gas is about 42 litres per hour and the antimony trichloride vapor is obtained by heating an amount of antimony trichloride at a temperature of about 50° C. in a closed space which communicates with the oven.

The gate electrode 7 is provided on the p-conductive region 3 by alloying a certain amount of indium on this zone at a temperature of about 450° C. After this contact has been established, the source 5 and the drain 6 are provided by local electrolytic deposition of nickel. The conditions under which the deposition takes place are not critical.

A certain part of the semi-conductive body 1 may be etched either by covering the other parts with a protective layer, so that the relevant part only is subjected to etching, or by dipping only the relevant part of the semi-conductive body into the etchant. The etchant is, for example, 20% hydrogen peroxide and the etching process is carried out at about 70° C.

Instead of etching away the lower side of the initial body before the gate 7 is provided, it is alternatively possible to omit the etching treatment and provide the gate 7 by alloying through the p-n transition located at the lower side, into the p-type region. It will be evident that the p-n transition must be interrupted, for example by etching, in order to insulate the electrodes 5 and 6 from electrode 7.

The provision of the p-n transition by diffusion affords the advantage that a flat p-n transition or junction is obtained, so that the transistor is more reproducible and better satisfies the requirements imposed with regard to regulation of the current path.

It is to be noted that numerous variants of the method of manufacturing and correct proportioning of the field-effect transistor itself are possible within the scope of the invention. Thus, for example, the whole surface or part thereof may be covered with an electrode layer, which may be divided by means of a groove into two separate electrodes 5 and 6 by removing a comparatively narrow path of the electrode material.

In the embodiment shown in FIG. 5, the electrodes 5 and 6 cover substantially the whole surface of the semi-conductive body. The etching process is then carried out so that only a small portion of the p-n transition 4 and the p-conductive region 3 remain. The method otherwise is accomplished in the same manner as described with reference to FIG. 4.

FIGS. 6 and 7 show other than rectangular contacts. In the embodiment shown in FIG. 6, a comparatively long groove 8 instead of a rectilinear groove is provided by giving the source 5 a shape which is lens-like in plan view. The source 5 is for the greater part surrounded by the drain 6. It is comparatively easy to secure the supply leads at the areas 12 and 14, the more so as the supply lead for the source is provided on the widest portion of the lens-like electrode.

In the embodiment shown in FIG. 7, the source 5 and the drain 6 are also separated by means of a comparatively long groove 8. The electrodes are comb-like, their tooth-like parts meshing into each other in the manner shown. In these embodiments, the groove 8 may be provided, for example, by chemical or electrolytic etching.

FIG. 8 shows a particular embodiment of a field-effect transistor according to the invention. An n-conductive surface layer 2 is diffused into the semi-conductive body 1. The gate comprises the p-conductive region 3 and the electrode 7 provided thereon. The ohmic electrodes 5 and 6 are provided on the n-conductive region. In plan view, the contact 5 is circular and the contact 6 is annular in shape and concentric with the contact 5. The contact 6 consists, for example, of electrolytically deposited nickel, the contact 5 being provided, for example, by applying an amount of tin-antimony solder (99% by weight of tin and 1% by weight of antimony) to the end of a tin-plated copper wire 12 and soldering this wire to the n-type region 2 at approximately 290° C. The groove 8 is provided by electrolytic etching, use being made of the depletion layer of the gate transition 10. For this purpose, the semi-conductive body was completely covered with a protective layer, except only the surface between the two electrodes 5 and 6, and in this condition dipped in an etching bath consisting of a 10% aqueous solution of potassium hydroxide. The electrode 5 was connected to earth, a voltage of −10 volts being maintained at the gate 7. A counter electrode in the etching bath had applied to it a voltage of −0.1 volt. The etching process took place at room temperature, that is to say, selectively in the surroundings of the electrode 5, and lasted till the groove reached the depletion layer 10. It is thus possible in a simple manner to manufacture a field-effect transistor according to the invention with the blocking voltage desired.

Since the n-type layer 2 is provided by diffusion, its surface has a low specific resistance. This low-ohmic surface extends from contact 6 to the circle 13 even after etching, so that the drain 6 is so-to-say shifted to the circle 13 and thus is adjacent the source 5, despite the fact that the distance between the electrodes 5 and 6 proper is comparatively large. This particular advantage, which is attributable to the fact that the n-type layer is a diffused layer, facilitates the manufacture of a field-effect transistor according to the invention to a considerable extent. The circular symmetry of the configuration shown in FIG. 8 offers the additional advantage that with the same dimensions it provides the maximum ratio between the length of the groove and the surface of the electrode and also considerably facilities the electrolytic etching of the groove.

It will readily be evident that, instead of germanium, it is also possible to utilize other semi-conductors or semi-conductive compounds, for example the silicon previously mentioned. Numerous further variants are possible. The current path from the source to the drain may alternatively be located in a p-conductive region. As a rule, this current path is preferably provided in an n-type region since the mobility of electrons is usually greater than that of holes.

What is claimed is:

1. A field-effect transistor comprising a body of semi-conductive material, a surface layer on said body of one conductivity type whose conductivity at the surface is high and whose conductivity inward of the said surface is low, spaced source and drain electrode connections to said surface layer at high-conductive surface body portions, a region of the opposite conductivity type in said body and spaced from the said surface and the source and drain electrodes, and a gate electrode connection to said region of the opposite conductivity type, said surface layer having an interruption between the source and drain electrodes and extending inward from the high-conductive surface into low-conductive body portions.

2. A transistor as set forth in claim 1 wherein the high-conductive surface has a resistivity less than 0.5 ohm-cm., and the body is of germanium.

3. A transistor as set forth in claim 1 wherein the high-conductive surface has a resistivity less than 1 ohm-cm., and the body is of silicon.

4. A transistor as set forth in claim 1 wherein the interruption comprises an elongated groove.

5. A field-effect transistor comprising a body of semi-conductive material, a diffused surface layer on one side of said body of one conductivity type whose conductivity at the surface is high and whose conductivity inward of the said surface is low, spaced source and drain electrode ohmic connections to said surface layer at the high-conductive surface body portions, a region of the opposite conductivity type in said body and spaced from the said surface and source and drain electrodes and defining a rectifying junction extending generally parallel to the said surface, and a gate electrode connection to said region of the opposite conductivity type on the opposite side of said body, said surface layer having an interruption between the source and drain electrodes and extending inward from the high-conductive surface into the low-conductive body portions and toward but spaced from the rectifying junction.

6. A transistor as set forth in claim 5 wherein the source and drain electrodes lie one within the other, and the interruption is a generally annular groove between the source and drain electrodes.

7. A transistor as set forth in claim 6 wherein one of the source and drain electrodes is circular, and the other is generally annular.

8. A transistor as set forth in claim 5 wherein the source and drain electrodes comprise interleaved portions separated by an interruption in the form of an elongated groove.

9. A field-effect transistor comprising a block of semi-conductive material of one conductivity type and a layer of semi-conductive material of opposite conductivity type forming a junction therewith, said second layer including a pair of relatively thick regions with low concentration gradients at the junction formed with the block, and a relatively thin portion separating said regions and forming the operating region of the transistor.

10. A field-effect transistor comprising a block of semi-conductive material of one conductivity type serving to form a gate region, a layer of semi-conductive material of opposite conductivity type forming a junction therewith, said layer including source, drain and channel regions, said channel region serving to separate said source and drain regions and being relatively small in two dimensions, and connections to said source, drain and gate regions, the connections to said source and drain regions being relatively small to reduce the capacitance between the connections and the gate region.

11. An electrical device comprising a monocrystalline given conductivity type semi-conductor body having two opposed major faces, one said major face bearing at least one groove across said face and a plurality of lands, all of said lands having throughout a conductivity greater than the conductivity of said body, the opposite major face having a surface zone of opposite conductivity type so as to form a rectifying barrier at the interface between said surface zone and the interior zone of said body, and a nonrectifying metal film on said lands and on at least a portion of said opposite major face.

12. An electrical device comprising a monocrystalline given conductivity type semi-conductor body having two opposed major faces, one said major face bearing at least one groove across said face and a plurality of lands, all of said lands having throughout a conductivity greater than the conductivity of said body, the opposite major face having a surface zone of opposite conductivity type and rectifying barrier at the interface between said surface zone and the interior zone of said body, and a metal film on said lands and on at least a portion of said opposite major face, said metal being electrically conductive but not affecting the conductivity type of said semi-conductor.

13. A unipolar transistor comprising a monocrystalline given conductivity type silicon body having two opposed major faces, one of said major faces bearing at least one groove across said face and a plurality of lands, all of said lands having throughout a conductivity greater than the conductivity of said body, the opposite major face having a surface zone of opposite conductivity type and a rectifying barrier at the interface between said surface zone and said interior zone, a non-rectifying metal film on said lands and over the entire opposite major face, and leads attached to said metal film on each said land and on said opposite face.

14. A unipolar transistor comprising a monocrystalline given conductivity type silicon body having two opposed major faces, one said major face bearing at least one groove across said face and a plurality of lands, all of said lands having throughout a conductivity greater than the conductivity of said body, the opposite major face having a surface zone of opposite conductivity type and a rectifying barrier at the interface between said surface zone and said interior zone, a metal film on said lands and over the entire opposite major face, said metal being electrically conductive but not affecting the conductivity type of said semi-conductor, and leads attached to said metal film on each said land and on said opposite face.

15. A photo-unipolar transistor comprising a monocrystalline given conductivity type silicon body having two opposed major faces, one said major face bearing at least one groove and a plurality of lands across said face, all of said lands having throughout a conductivity greater than the conductivity of said body, the opposite major face having a surface zone of opposite conductivity type, a rectifying barrier at the interface between said surface zone and the interior zone of said body, a non-rectifying metal film on said lands and on a portion of said opposite major face, and leads attached to said metal film on each said land and on said portion of said opposite face.

16. A photo-unipolar transistor comprising a monocrystalline given conductivity type silicon body having two opposed major faces, one said major face bearing at least one groove and a plurality of lands across said face, all of said lands having throughout a conductivity greater than the conductivity of said body, the opposite major face having a surface zone of opposite conductivity type, a rectifying barrier at the interface between said surface zone and the interior zone of said body, a metal film on said lands and on a portion of said opposite major face, said metal being electrically conductive but not affecting the conductivity type of said semi-conductor, and leads attached to said metal film on each said land and on said portion of said opposite face.

References Cited

UNITED STATES PATENTS

| | | | |
|---|---|---|---|
| 2,629,672 | 2/1953 | Sparks | 117—37 |
| 2,663,806 | 12/1953 | Darlington | 307—88.5 |
| 2,744,970 | 5/1956 | Shockley | 317—235 |
| 2,748,041 | 5/1956 | Laverenz | 148—33 |
| 2,771,382 | 11/1965 | Fuller | 148—1.5 |

JAMES D. KALLAM, *Primary Examiner.*

J. WESTBY, S. BERNSTEIN, *Examiners.*

A. B. GOODALL, *Assistant Examiner.*